(12) United States Patent
Skaggs

(10) Patent No.: US 12,484,936 B1
(45) Date of Patent: Dec. 2, 2025

(54) SYSTEMS AND METHODS FOR TREATING SPINAL CONDITIONS

(71) Applicant: David Skaggs, Los Angeles, CA (US)

(72) Inventor: David Skaggs, Los Angeles, CA (US)

( * ) Notice: Subject to any disclaimer, the term of this patent is extended or adjusted under 35 U.S.C. 154(b) by 0 days.

(21) Appl. No.: 18/775,348

(22) Filed: Jul. 17, 2024

(51) Int. Cl.
*A61B 17/70* (2006.01)
*A61B 17/68* (2006.01)

(52) U.S. Cl.
CPC ...... *A61B 17/7019* (2013.01); *A61B 17/7028* (2013.01); *A61B 2017/681* (2013.01)

(58) Field of Classification Search
CPC ...... A61B 17/7029; A61B 2017/00411; A61B 2017/00212
See application file for complete search history.

(56) References Cited

U.S. PATENT DOCUMENTS

| | | | | |
|---|---|---|---|---|
| 7,135,022 | B2* | 11/2006 | Kosashvili | A61B 17/7216 623/23.47 |
| 7,785,351 | B2* | 8/2010 | Gordon | A61F 2/4405 606/259 |
| 8,137,349 | B2* | 3/2012 | Soubeiran | A61B 17/7216 606/68 |
| 8,568,457 | B2* | 10/2013 | Hunziker | A61B 17/7014 606/259 |
| 8,585,739 | B2 | 11/2013 | Ritland | |
| 8,632,548 | B2* | 1/2014 | Soubeiran | A61B 17/025 606/90 |
| 9,113,967 | B2* | 8/2015 | Soubeiran | A61B 17/7216 |
| 9,943,345 | B2* | 4/2018 | Nill | A61B 17/7016 |
| 10,349,982 | B2* | 7/2019 | Culbert | A61F 2/44 |
| 11,612,416 | B2* | 3/2023 | Wentz | A61B 17/7016 606/258 |
| 2004/0267260 | A1* | 12/2004 | Mack | A61B 17/7028 606/907 |
| 2005/0124991 | A1* | 6/2005 | Jahng | A61B 17/3421 606/261 |
| 2005/0246034 | A1* | 11/2005 | Soubeiran | A61B 17/7216 623/23.45 |
| 2006/0142758 | A1* | 6/2006 | Petit | A61B 17/7029 606/257 |

(Continued)

FOREIGN PATENT DOCUMENTS

RU 2752030 C1 7/2021

*Primary Examiner* — David W Bates
(74) *Attorney, Agent, or Firm* — Farber LLC

(57) ABSTRACT

Systems and methods are provided for treating and/or correcting spinal diseases, disorders, conditions, and deformities. A method for decompressing a spine of a patient comprises advancing first and second bone anchors through an opening in the patient to a target portion of a vertebral column and securing the first and second bone anchors to first and second bones within the vertebral column. A connector element is positioned between the first and second bone anchors and a force is applied to the connector element to distract the vertebral column and at least partially decompress the target portion of the vertebral column. The force applied by the connector element may be sufficient to increase the distance between two adjacent vertebral bodies to restore disc height or it may be sufficient to increase the space within the neural foramina in the patient to open the neural foramina and decompress one or more nerve roots therein.

14 Claims, 13 Drawing Sheets

(56) References Cited

U.S. PATENT DOCUMENTS

| | | | | |
|---|---|---|---|---|
| 2006/0264937 A1* | 11/2006 | White | A61B 17/7031 | 606/907 |
| 2007/0016193 A1* | 1/2007 | Ritland | A61B 17/7011 | 606/257 |
| 2007/0093815 A1* | 4/2007 | Callahan, II | A61B 17/7029 | 606/279 |
| 2007/0162002 A1 | 7/2007 | Tornier | | |
| 2008/0312693 A1* | 12/2008 | Trautwein | A61B 17/7028 | 606/264 |
| 2009/0048631 A1* | 2/2009 | Bhatnagar | A61B 17/7004 | 606/264 |
| 2010/0160967 A1* | 6/2010 | Capozzoli | A61B 17/8869 | 606/256 |
| 2012/0016420 A1* | 1/2012 | Naraghi | A61B 17/707 | 606/279 |
| 2012/0221054 A1* | 8/2012 | Jackson | A61B 17/7001 | 606/259 |

* cited by examiner

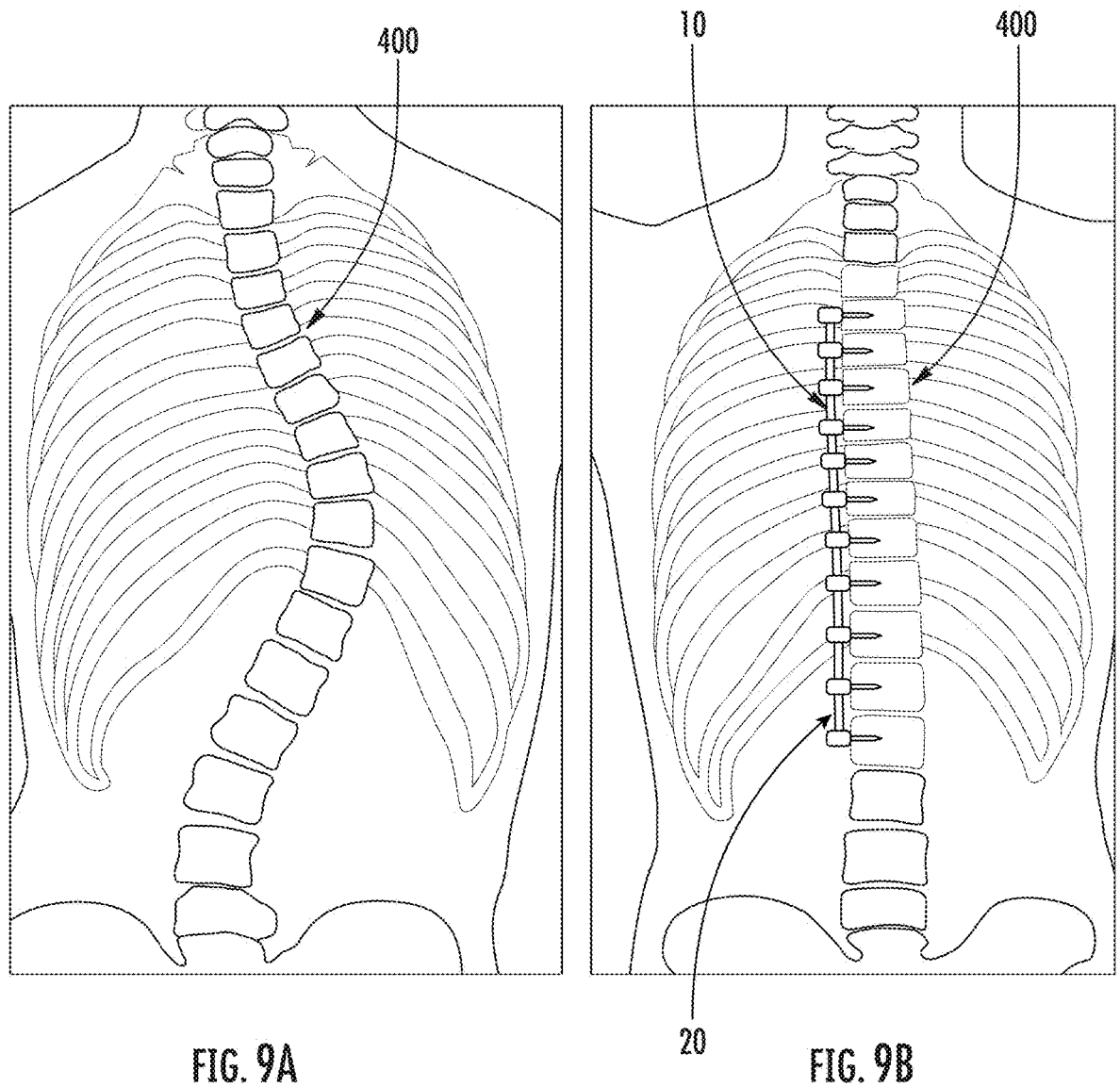

SYSTEMS AND METHODS FOR TREATING SPINAL CONDITIONS

TECHNICAL FIELD

The present disclosure relates to implantable spinal systems and methods of using such systems for the correction and/or treatment of a spinal condition, disease, deformity, or disorder. More particularly, the implantable spinal systems may be configured for insertion through an anterior approach while also being able to preserve motion. Even more particularly, the implantable spinal systems may be configured for segmental treatment of discrete levels of the spine.

BACKGROUND

Spinal disorders include medical conditions that cause damage and/or deterioration to the spinal cord. These conditions may include spinal stenosis, degenerative disc diseases, herniated discs, osteoarthritis, and/or spinal curvature disorders, such as kyphosis, lordosis and/or scoliosis.

Spinal stenosis is a medical condition caused by the narrowing of one or more spaces within the spinal canal. A tightened space can cause the spinal cord or nerves to become irritated, compressed or pinched, which leads to back pain and other nerve issues, such as sciatica, numbness, and weakness. Spinal stenosis may be congenital or acquired. Acquired stenosis may be caused by several factors, such as bone overgrowth via osteoarthritis or bone spurs, bulging or herniated discs from degenerative disc disease, spinal fractures, cysts, or tumors.

Spinal stenosis is initially treated with conservative therapy, such as by applying heat or cold to the affected area, with exercise, medications such as NSAIDs, and with physical therapy. Corticosteroid injections may be used in the space around the pinched spinal nerves to help reduce inflammation, pain, and irritation. When these measures fail, surgery may be required. The surgery may comprise a decompression procedure, such as a laminectomy, laminotomy or foraminotomy. In some cases, an interspinous process spacer may be inserted between the spinous processes to help restore disc height. For some patients, none of these options bring complete relief to the symptoms due to the stenosis.

Degenerative disc disease (DDD) is a medical condition typically brought on by trauma, injury, or the normal aging process. DDD results in anatomic changes to the vertebrae and possibly a loss of function of one or more intervertebral discs of the spine. DDD may cause mild to severe pain, either acute or chronic, near the involved disc, as well as neuropathic pain in an adjacent nerve root.

Treatment of DDD typically begins with a combination of conservative treatment options, such as physical therapy, nonsteroidal anti-inflammatory drugs, or epidural steroid injections. If these options fail, surgical options typically include microdiscectomy and/or fusion. Microdiscectomy involves the surgical removal of the abnormal disc material that presses on the nerve root or the spinal cord. Fusion involves the removal of the disc material and then the welding of two or more adjacent vertebrae together such that they heal into a single, solid bone. Fusion may also involve the implantation of an interbody fusion device to restore disc height of the affected spinal region.

Conventional surgical procedures for treating DDD have several drawbacks. The fusion of adjacent vertebrae can place additional stress and strain on the vertebrae immediately above and below the fused portion, which may increase the rate in which those areas of the spine degenerate (referred to as adjacent segment disease). Thus, even when spinal fusion provides symptom relief, it does not cure the disease and therefore does not prevent the patient from developing more back pain in the future. In addition, spinal fusion has a relatively high failure rate, and is generally permanent and irreversible. The only options for failed fusion procedures are to attempt to revise the surgery, extend the fusion to adjacent vertebrae or attempt to relieve the pain with spinal cord stimulation or similar methods. None of these options have had significant success.

Spinal curvature disorders involve a deviation from the normal curvature of the spine. A healthy spine depends on the natural curves to help absorb stress from everyday movements and activities. Spinal curvature disorders may include lordosis, kyphosis and/or scoliosis. Lordosis, commonly referred to as swayback, occurs when the spine curves significantly at the lower back. Kyphosis refers to an abnormally rounded or hunched upper back. Scoliosis can generally be described as the abnormal, sideways curvature of the spine in the frontal plane, though it often is accompanied by deformities in the sagittal and transverse planes as well.

Scoliosis can affect people of any age, from babies to adults, but occurs most often during childhood or early adolescence. In most cases, the condition has no known cause, which is why it is often referred to as idiopathic scoliosis. In the most common form of scoliosis, adolescent idiopathic scoliosis, there is decreased kyphosis of the thoracic spine, which can limit the space available for pulmonary function in the thorax, as well as negatively affect the alignment of the cervical and lumbar spine.

Treatments for scoliosis depend on the severity of the condition. For some patients, the use of an external back brace over time may be sufficient to minimize progression of the deformity. The brace may be worn just at night, or all the time. For other patients, due to the severity of the curvature, or when bracing has failed to result in a desired outcome, a surgical approach may be necessary. One of the surgical approaches common today is to perform a spinal fusion surgery. A typical spinal fusion surgery for correction of scoliosis involves implanting rods to realign the spine by securing the rods to the spine using hooks and screws. Over time, the rigid system promotes fusion between adjacent spinal segments secured to the rigid rods, thereby maintaining the corrected curvature by eliminating the ability of the spinal segments to move out of alignment relative to one another.

The spine fusion surgery may be performed using an anterior surgical approach to access the front of the patient's spine. The anterior approach offers the benefit of an open, direct access to the front of the spinal column without cutting through muscle tissue in the patient's back or moving the nerves, since the surgeon is coming from the patient's abdomen. Another benefit that an anterior approach-configured system and method provides is an option for treating failed posterior fusion surgeries. Certain types of scoliosis curves, particularly ones involving the thoracolumbar spine, are especially amenable to an anterior approach. This approach also enables the surgeon to fuse a shorter segment of the spine, preserving more motion.

While the anterior surgical approach offers many benefits, its lack of popularity among the spine surgeon community is due in part to the level of difficulty of the procedure as well as lack of regular experience performing the procedure. For experienced and highly skilled surgeons, many prefer this anterior approach. For the inexperienced surgeon, anterior spine surgery may be viewed as a daunting challenge that poses additional risks for the patient. For example, to access the thoracic spine using an anterior approach, the surgeon goes through the front of the patient's chest, and specifically through an incision in the side of the chest, to secure the corrective spinal fusion system to the vertebrae. Usually, a lung must be deflated to access the spine during the procedure. There is risk of damaging organs and blood vessels, in addition to potentially weakening pulmonary function during the implantation process. If the fusion is extended to the lumbar spine, the diaphragm is often cut and released from the chest wall and spine. In addition, in the lumbar spine there are nerve roots in and along the psoas muscle, as well as small vessels adjacent to the vertebrae and major vascular structures, all of which may be injured during the surgery.

For these reasons, surgeons have begun to favor a posterior surgical approach to the spine to avoid the aforementioned problems and enable access of the entire thoracic and lumbar spine with equal ease. And while this posterior surgical approach to fusion surgery has gained in popularity because it avoids the drawbacks to the traditional anterior approach and is a familiar and safe approach for surgeons, the overall spinal fusion procedure still has drawbacks. An undesirable result of this type of surgery is the very result the surgery is intended to produce: fusion of the spine, which limits growth and motion.

In young patients, there are growth friendly surgeries designed to improve spine deformity while permitting growth, though these have high complication rates, often require multiple surgeries, and generally do not allow normal growth of the spine. One type of growth friendly surgery for scoliosis is vertebral body tethering. In this surgery, through an anterior approach, spine implants are secured to the vertebral bodies on the convex side of the frontal plane curve. Tension is usually placed across the implants that are connected with a flexible cord (tether) which improves the lateral curve of the spine at the time of surgery. In theory, this approach limits growth thorough compression of growth plates on the convex side of the spine, while allowing growth of the concave half of the spine, leading to further improvement of the lateral curve over time with growth. In the sagittal plane, such tensioning at the time of surgery leads to production of kyphosis. Over time, limiting anterior growth of the spine, while permitting posterior growth of the spine, also leads to production of kyphosis.

While this new procedure has shown promise, it has suffered from certain drawbacks. For example, it requires an anterior approach to the spine, has a high rate of complications such as breakage of the tether and over correction, and may require additional anterior surgery through a scarred surgical field that is associated with increased bleeding as well as other complications such as damage to the lung and pulmonary function. In addition, the tether limits growth and in general has been quite disappointing.

What is therefore needed are improved corrective spinal systems and methods that can sufficiently treat spinal conditions, diseases, deformities, or disorders, such as DDD, spinal stenosis and spinal curvature disorders. It would also be desirable to provide a system that preserves motion, restores spine alignment, disc height and/or decompresses the nerve roots without requiring a discectomy or an interbody fusion procedure.

Even more desirable are systems that can be implanted in an anterior approach. Still even more desirable are systems that are configured to treat multiple levels at the same time, or can be applied as shorter segments to treat select levels of the spine. The systems should ideally be able to treat a single level, while also being able to treat multiple levels where the levels are not required to be adjacent to one another.

SUMMARY

The present disclosure provides systems and methods for treating and/or correcting spinal diseases, disorders, conditions, or deformities. These systems are configured to preserve motion, restore spine alignment, disc height and/or decompress the nerve roots without requiring a discectomy or an interbody fusion procedure. In addition, the systems can be implanted in either an anterior or posterior approach. The systems are configured to treat multiple spinal segments at the same time. The systems can accomplish this by offering either a long segment option or a short segment option. The long segment option can treat multiple levels of the spine at the same time, where the multiple levels can be adjacent spinal levels. Alternatively, the systems can provide shorter segment treatment of smaller spinal levels, including a single level. These single levels do not have to be adjacent to one another.

In various embodiments, the systems and methods are particularly useful for treating spinal stenosis and/or degenerative disc disease (DDD) by restoring disc height, decompressing spinal nerves and/or reducing pain within a target area of the spinal column. In other embodiments, the systems and methods may be useful in correcting spinal deformities related to an abnormal curvature of the spine, such as lordosis, kyphosis, or scoliosis. The systems and methods may be particularly useful for correcting spinal deformity in the coronal plane (scoliosis), the sagittal plane, (lordosis and kyphosis) and/or the transverse plane (rotation).

According to one aspect, a method for decompressing a spine of a patient comprises advancing first and second bone anchors through an opening in the patient to a target portion of a vertebral column and securing the first and second bone anchors to first and second bones adjacent to, or near, the target portion of the vertebral column. A connector element is positioned between the first and second bone anchors and a force is applied to the connector element to distract the vertebral column and at least partially decompress the target portion of the vertebral column.

In various embodiments, the force applied by the connector element is sufficient to increase the distance and/or the angle between a first vertebral body and a second vertebral body within the target portion of the vertebral column. In certain embodiments, this force is sufficient to increase a height of a neural foramina in the patient to open the neural foramina and decompress one or more nerve roots therein.

The method may be particularly useful as a fusionless motion preservation system for the treatment of disc degeneration, spinal stenosis or other spinal disorders that may cause a reduction in disc height, compressed spinal nerves and/or pain. The method allows for the restoration of spine alignment in three dimensions, restoration of disc height and decompression of the nerve roots without performing a discectomy or an interbody fusion procedure. In some embodiments, axial dynamic distraction of a degenerated disc over a period of time may cause the disc to regenerate. In addition, this provides a less expensive and relatively "reversible" procedure compared to fusion and other spinal procedures currently used for the treatment of disc degeneration.

In various embodiments, the method comprises securing the first and second bone anchors to a single vertebral level within the patient's spinal cord. A single vertebral level is defined herein as a functional spinal unit (FSU) which comprises two adjacent vertebral bodies and the disc located therebetween. In these embodiments, the distraction device is targeted at a single level to decompress the space between two adjacent vertebral bodies when, for example, the disc has degenerated and lost some of its original height. The distraction device increases the distance between the two vertebral bodies to restore disc height and decompress the spinal nerves without interfering with other levels of the spine. Precise targeting of a single level within the spinal cord allows the user to decompress a specific area of the spine without compromising adjacent healthy discs.

In various embodiments, the method further comprises increasing a length of the connector element to increase the distraction applied to the spinal column and further correct the disorder. For example, the length of the connector element may be increased gradually over time, in discrete steps or continuously, to gradually decompress the target portion of the spinal column.

The connector may comprise a rod, cord, cable, band, or spring. In certain embodiments, the connector element comprises a dynamic force element that has sufficient elasticity to lengthen over time dynamically, such as a spring, piston, an elastic rod, a polymer spacer, pneumatic or hydraulic mechanism or the like. The dynamic force element may be lengthened by exerting distraction forces on the element through springs, pneumatics, magnets, motors, or other means of producing force. In certain embodiments, the system further comprises a remote actuator for lengthening the dynamic force element from outside of the patient's body. For example, magnetically controlled connecting elements can be lengthened between vertebrae by an external controller.

In some embodiments, the force applied by the connector element may be adjustable to either increase or decrease the distraction force applied to the target area of the spinal cord. This allows the surgeon to gradually increase this force until, for example, the patient's symptoms are relieved without applying too much distraction to the target area. In addition, this may allow the surgeon to either increase or decrease the force applied over time. For example, the surgeon may adjust the force applied to the connector element if the target disc continues to degenerate over time and additional distraction is required to relieve new symptoms.

In some embodiments, the system further comprises a distraction member configured to couple to one portion of the connector element and to maintain a force on the connector element between the first and second bone anchors. The distraction member may be configured to couple to the proximal end of the connector element adjacent to a side of the first head portion facing away from the second bone anchor. In certain embodiments, the distraction member comprises an external instrument configured to apply a force to the connector element. In other embodiments, the distraction member may comprise an internal distraction device, such as a coil spring surrounding the connector element.

In various embodiments, the method includes implanting a series of connector elements across multiple vertebrae along the spinal column. In certain embodiments, the connector elements are attached to each other such that the anchors and connector elements form a continuous distraction system across multiple vertebrae. In other embodiments, each of the connector elements may be separated and uncoupled from the other connector elements, forming a series of individual implants across each disc.

In various embodiments, the connector elements may be configured to apply the same, or different forces to each disc. In addition, or alternatively, the connector elements may comprise dynamic force elements that are configured to increase their lengths at the same or at a different rate from each other. This allows the surgeon to individually tailor each implant based on the condition of each disc within the spinal column.

In embodiments, the method comprises advancing a first end of the connector element through first and second head portions of the first and second bone anchors, respectively, such that the connector element extends at least from the first bone anchor to the second bone anchor. A first end of the connector element may be secured to the first head portion. A force may then be applied to a second end of the connector element from the second head portion to achieve the desired distraction to the curved portion of the spinal column. The connector element is then secured to the second head portion to maintain the distraction between the first and second bone anchors. Alternatively, the connector element may be at least partially secured to the first and second bone anchors and then distracted to achieve the desired force. The steps above may be repeated at either an adjacent, or different, level of the same spinal column.

In one embodiment, the opening is a posterior opening in the back of the patient, and the first and second bone anchors are secured to a curved portion of the posterior side of the vertebral column. In another embodiment, the opening is an anterior opening in the front of the patient, and the first and second bone anchors are secured to the curved portion of the anterior side of the vertebral column.

In various embodiments, the curved portion of the vertebral column has a concave side and a convex side. The method further comprises securing the first and second bone anchors to the convex side of the vertebral column. A force is applied to the connector element to distract the vertebral column on the convex side to correct the curved portion. In other embodiments, the method comprises securing the first and second bone anchors to the concave side of the vertebral column. A force is applied to the connector element to distract the vertebral column on the concave side to correct the curved portion.

In certain embodiments, the bone anchors may be secured to vertebral bodies in the spinal column. In other embodiments, the bone anchors may be secured to ribs or other bones in the patient.

In another aspect, an implantable spinal device for decompressing a spine of a patient comprises first and second bone anchors configured for securing to first and second adjacent vertebral bodies and a dynamic force element extendible between the first and second bone anchors and configured to lengthen over time. The dynamic force element is configured to distract the vertebral column and at least partially decompress a target portion of the vertebral column.

In various embodiments, the dynamic force element has sufficient elasticity to dynamically lengthen over time and may comprise a spring, an elastic rod, a polymer spacer, elastic band or the like. In other embodiments, the dynamic force element may be lengthened by exerting distraction forces on the element through springs, pneumatics, magnets, motors, elastic bands or other means of producing force. In various embodiments, the device further comprises an external actuator, such as a magnet or a controller that is configured to increase a length of the dynamic force element.

In one embodiment, the distraction device consists of a single connector element with the first and second bone anchors configured to distract a single vertebral level within the patient's spinal cord. In this embodiment, the distraction device is targeted at a single level to decompress the space between two adjacent vertebral bodies when, for example, the disc has degenerated and lost some of its original height. This increases the distance between the two vertebral bodies to restore disc height and decompress the spinal nerves without interfering with other levels of the spine.

In an exemplary embodiment, the first bone anchor comprises a first rod with an internal channel and the second bone anchor comprises a second rod configured to extend into the internal channel of the first rod. The second rod is movable (e.g., telescoping) relative to the first rod to move the first and second bone anchors towards and away from each other. The device may further comprise an elastic band coupling the first rod with the second rod. Each of the first and second rods comprises a projection extending transversely and the elastic band is wrapped around each of the projections to elastically couple the first bone anchor to the second bone anchor.

The device may comprise a biasing member, such as a spring or the like, that biases first and second bone anchors apart. The elastic band holds anchors together against the force of spring. Over time, the band with stretch and allow the second rod to move relative to the first rod such that that bone anchors are moved away from each other, thereby potentially restoring at least some (if not all) of the original disc height, decompressing spinal nerves and/or reduce pain originating from the target area.

In other embodiments, the device further comprises a third bone anchor configured for securing to the second vertebral body, and a second dynamic force element extendible between the second and third bone anchors and configured to lengthen over time. In these embodiments, the first and second dynamic force elements are coupled to each other to form a continuous system across the spinal column.

In other embodiments, the device further comprises a third bone anchor configured for securing to the second vertebral body, a fourth bone anchor configured for securing to a third vertebral body adjacent to the second vertebral body, and a second dynamic force element extendible between the third and fourth bone anchors and configured to lengthen over time. In these embodiments, each of the connector elements may be separated and uncoupled from the other connector elements, forming a series of individual implants across each disc.

In some embodiments, the bone anchors are specifically configured for placement on the convex side of the spinal column. In one such embodiment, the first bone anchor comprises a first head portion and a first shank portion, and the second bone anchor comprises a second head portion and a second shank portion. The first and second shank portions are configured to engage bone to secure the first and second bone anchors to first and second vertebral bodies on the concave side of the spinal column.

In certain embodiments, the bone anchors comprise screws configured for securing into vertebral bodies of the spinal column. In other embodiments, the bone anchors are configured for securing to ribs or other bones in the patient.

The dynamic force element is configured to be longitudinally displaceable through the first and second head portions. The system may further comprise a securing element, such as a screw, fastener or the like, receivable within the second head portion to secure a portion of the dynamic force element from longitudinal displacement relative to the first and second head portions. In one embodiment, the securing element comprises a screw and the second head portion comprises an internal threaded portion threadably engageable with the screw.

In another aspect, a method for treating a spinal deformity of a patient comprises advancing first and second bone anchors through an opening in the patient to a target portion of a vertebral column and securing the first and second bone anchors to first and second bones adjacent to, or near, the target portion of the vertebral column. A connector element is positioned between the first and second bone anchors and a force is applied to the connector element to distract the vertebral column and at least partially correct the spinal deformity. The length of the connector element is increased over time to gradually increase the force applied to the first and second bone anchors.

In certain embodiments, the deformity or condition to be treated is lordosis, and the method comprises applying sufficient force to the connector element to reduce a degree of posterior curvature of the curved portion of the spine. In another embodiment, the deformity or condition to be treated is scoliosis, and the method comprises applying sufficient force to the connector element to reduce a degree of lateral curvature of the curved portion of the spine. In yet another embodiment, the deformity or condition to be treated is kyphosis, and the method comprises applying sufficient force to the connector element to reduce a degree of kyphosis of the curved portion of the spine.

In various embodiments, the method further comprises increasing a length of the connector element to increase the distraction applied to the spinal column and further correct the curvature. For example, the length of the connector element may be increased gradually over time, in discrete steps or continuously, to gradually decompress the target portion of the spinal column. In these embodiments, the connector element comprises a dynamic force element that dynamically lengthens over time, such as a spring, polymer spacer, elastic band or the like. In other embodiments, the connector element is lengthened by an external actuator, such as a magnet or a controller that may be located outside of the patient's body.

In various embodiments, the method includes implanting a series of connector elements across multiple vertebrae along the spinal column. In certain embodiments, the connector elements are attached to each other such that the anchors and connector elements form a continuous distraction system across multiple vertebrae. In other embodiments, each of the connector elements may be separated and uncoupled from the other connector elements, forming a series of individual implants across each disc or spinal segment.

In some embodiments, the method includes distracting the connector element sufficiently to at least partially correct the curved portion of a spinal column in at least two different planes. The connector element may be distracted sufficiently to at least partially correct the curved portion of the vertebral column in the frontal plane and/or the sagittal plane. In addition, or alternatively, the connector element may be distracted sufficiently to at least partially correct a rotation of the curved portion of the vertebral column in the transverse plane. The method provides the benefit of allowing multi-plane (i.e., frontal, sagittal and/or transverse plane) correction of the spine curvature.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIGS. 9A and 9B are representative drawings of a spine having a deformity before and after correction with the implantable spinal system of the present disclosure, in which FIG. 9A shows the spine before correction and FIG. 9B shows the spine after correction;

DETAILED DESCRIPTION OF THE EMBODIMENTS

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Provided herein are systems and methods for treating and/or correcting spinal diseases, disorders, conditions, or deformities. These systems are advantageously configured to treat and/or correct while also preserving motion, restoring spine alignment, disc height and/or decompressing the nerve roots. In addition, the systems can be implanted in either an anterior or posterior approach. The systems are configured to treat multiple spinal segments at the same time. The systems can accomplish this by offering either a long segment option or a short segment option. The long segment option can treat multiple levels of the spine at the same time, where the multiple levels can be adjacent spinal levels. Alternatively, the systems can provide shorter segment treatment of smaller spinal levels, including a single level. These single levels do not have to be adjacent to one another. Various exemplary embodiments of these systems and the methods of using the systems to treat and/or correct spinal diseases, disorders, conditions, or deformities are now described herein below.

Figure 1:
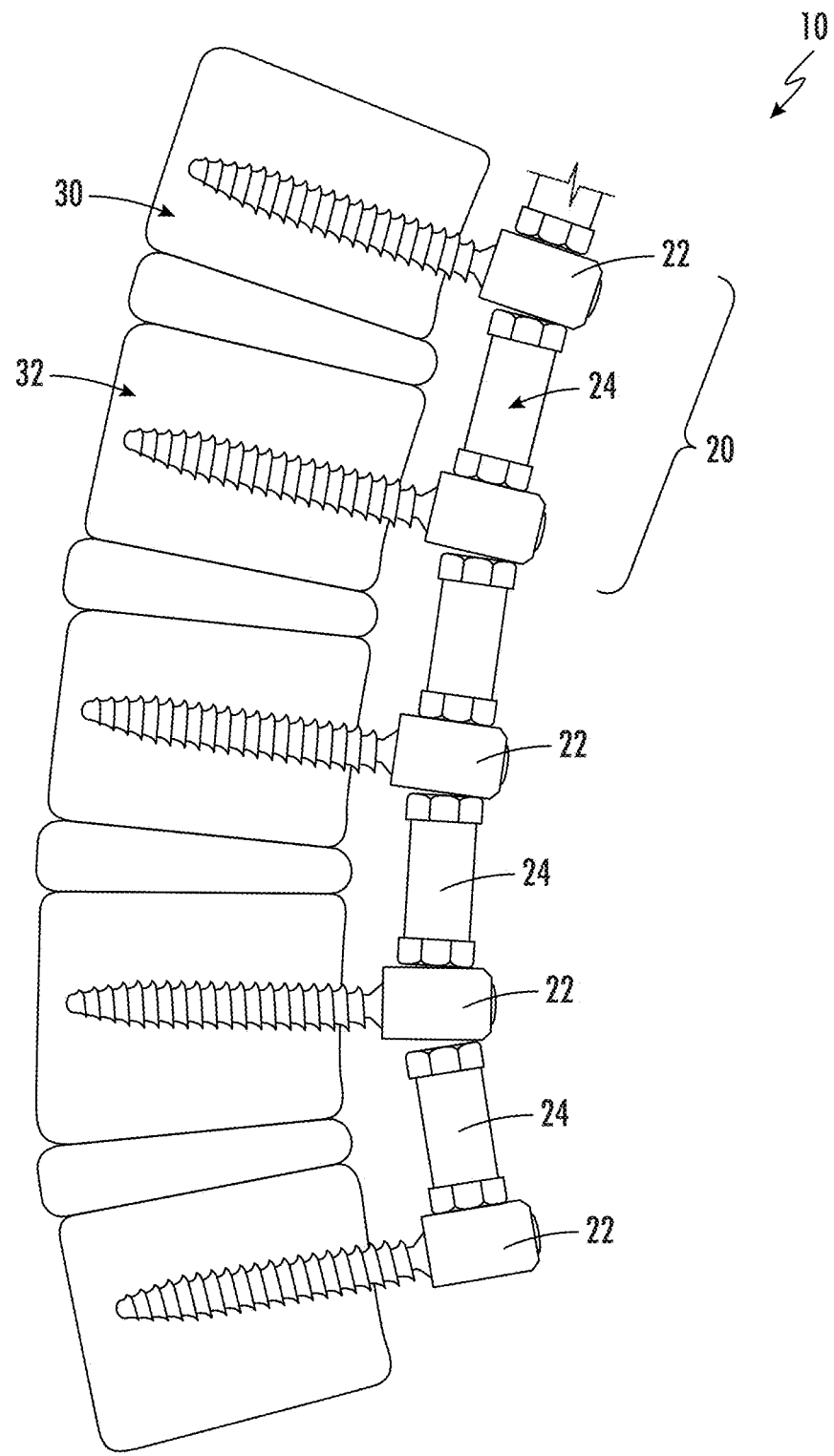
FIG. 1 illustrates an exemplary embodiment of an implantable distraction system for treating a spinal disorder.

Referring now to FIG. 1, an implantable spinal system 10 is provided that may be used to decompress a target area of the spine to restore disc height, decompress spinal nerves and/or reduce pain within the target area, with or without fusing one or more intervertebral bodies. In one embodiment, system 10 may be used to treat degenerative disc disease and/or spinal stenosis, such as foraminal stenosis. System 10 may also be used to correct spinal deformities, such as an abnormally curved portion of a vertebral column. System 10 may be particularly useful for treating and/or correcting scoliosis, kyphosis, lordosis, or other deformities with or without fusing one or more intervertebral bodies. In one embodiment, system 10 is configured to provide concave distraction and motion preservation for scoliosis treatment, and is particularly applicable in a young patient with a growing spine, but may also be used with adults.

System 10 includes one or more distraction devices 20 for the treatment of a spinal segment within a curved portion of a vertebral column. Each distraction device 20 allows for decompression and/or correction of the curvature of the spinal segment to which it is attached. For example, a spinal segment may comprise first and second adjacent vertebral bodies 30, 32. Each distraction device 20 may comprise a pair of fixation devices, such as bone anchors 22, configured for implantation into vertebral bodies 30, 32 and connected with a flexible, resilient connector element 24. Bone anchor (s) 22 may comprise any anchor configured for attachment to the bone of the spine or ribs, including but not limited, to screws, hooks, darts, ties, or any other element for fixing the longitudinal portion to bone.

Connector element 24 is placed between the bone anchors 22, and together, forms each distraction device 20 of system 10. Distraction is produced and maintained between the anchors 22. The connector element 24 may provide a distraction force through springs, pneumatics, magnets, motors, or other means of producing force.

Connector elements 24 preferably comprise a dynamic force element that is extendible between the two bone anchors 22 and is configured to lengthen over time to distract across a disc and increase disc height. Thus, the force applied by each connector element 24 to the spinal segment changes over time as the spinal segment is distracted. In certain embodiments, the dynamic force elements comprise a spring or a polymer spacer. The polymer may comprise any suitable material that has sufficient elasticity to increase in length over time, such as polycarbonate, urethane, or the like.

System 10 may further comprise a controller or actuator (not shown) coupled to connector element 24 and configured to increase or decrease a length of the connector element 24 between the bone anchors 22. For example, the connector element 24 may be increased in length gradually over time to further distract the disc space and/or correct the spinal deformity. This increase may occur in discrete steps or continuously. In certain embodiments, the controller may be an external controller that remotely controls the length of connector element 24 between adjacent vertebrae. For example, connector element 24 may include one or more magnetic poles and the external controller may comprise an energy source for generating a magnetic field that causes the magnetic poles to move away from each other.

Connector element 24 is configured to provide sufficient resistance between the anchors; however, it is also recognized that some distraction can lead to increased motion. The connector element 24 may be formed of a braided or woven polymeric material that also allows some degree of movement to preserve motion. In one embodiment, the connector element 24 may be configured as a flexible but resilient elastic rod or cord connecting the two screws 22. In other embodiments, the connector element 24 may be pleated, or folded, to allow for elongation as the distance between the screws increases with the growth of the spine. In still other embodiments, the connector element may be a flat, elastic band.

While the connector element 24 is shown having a circular cross-section, it is understood that it may have any cross-section desired such as, but not limited to, square, rectangle, polygonal or elliptical. In one embodiment, connector element 24 may be formed from polyethylene-terephthalate (PET), although it will be recognized that various other materials suitable for implantation within the human body may be used. For example, connector element may comprise other materials, such as metal, polymeric materials, or combinations of flexible materials. Connector element 24 may be of any length necessary to extend through the curved portion of the spinal column, for example, between two, three, four or more vertebral bodies of the spinal column.

In some embodiments, connector element 24 may vary in flexibility and elongation properties along the length of the connector element 24. For example, a portion of connector element 24 may be significantly more rigid if greater correction of a spinal deformity is needed at particular levels of the spine and less rigid in levels of the spine requiring less correction. In some embodiments, system 10 may further comprise an internal member, such as a spring member or the like, to provide force to the connector element 24 and potential elongation of the connector element 24. For example, the internal member may be a helical spring, or a polymeric spacer loaded in decompression and surrounding at least a portion of connector element 24.

In other embodiments, the system may comprise an external element or instrument (not shown) that applies force to distract connector element 24. The external instrument may, for example, comprise a handle having an opening for receiving one end of connector element 24. The handle may include a force applying mechanism, such as a rack and cleats, and a user adjustable element, such as a knob, trigger, or the like, to pull connector element into the handle and thereby provide force to the connector element that has been placed within bone anchors 22. The mechanism may also include a visual indicator or gauge that provides an indication of the force applied to connector element.

In some embodiments, the connector element 24 can have an outer sheath (not shown), such as for example, an over-sized polycarbonate urethane (or similar material) outer sheath. In other embodiments, the outer sheath may be an expandable (e.g., pleated) bellows or a telescoping sheath that allows for elongation. This outer sheath can provide distraction in an elastic or otherwise mobile fashion. The outer sheath may also serve as a spacer.

In other embodiments, the system may include an external tube (not shown) that is more rigid than connector element 24. Connector element 24 may, for example, be advanced through the tube to facilitate insertion of connector element 24 through an opening in the patient to the spinal column.

According to another aspect of the spinal system, the distraction device 20 may be formed as a flexible, resilient spring. This spring may also be used with an outer sheath as described above with the connector element 24. The spring may be polymeric or metallic.

In one embodiment, bone anchors 22 comprise screws that are specifically configured for placement along the concave side of a curved portion of the spins. Thus, the screws are configured to be concave and placed against the spine, which anchors provide distraction, and while the entire construct (i.e., anchors and connector element) allows motion.

Figure 2:
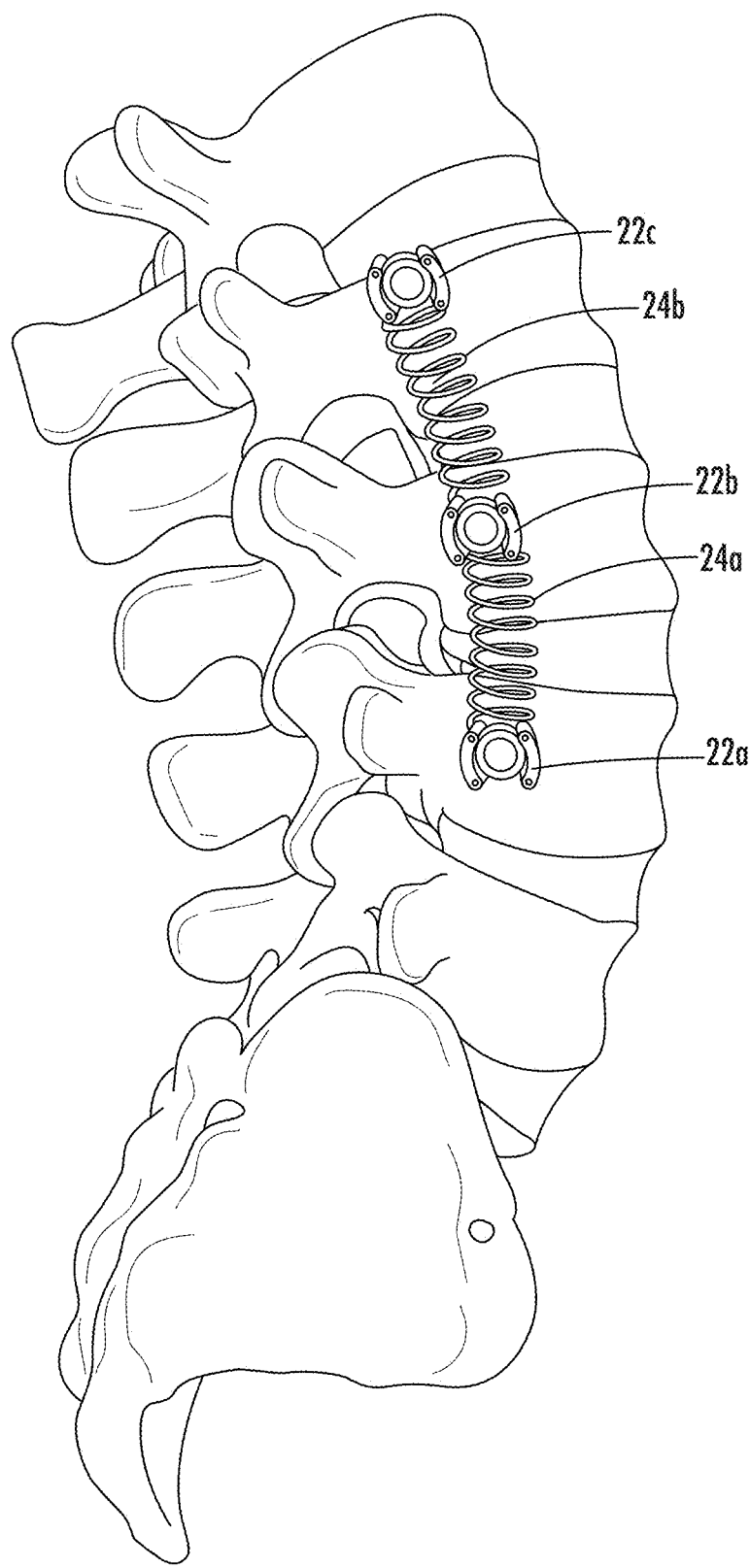
FIG. 2 illustrates the distraction system of FIG. 1 implanted on a vertebral column.
Figure 8:
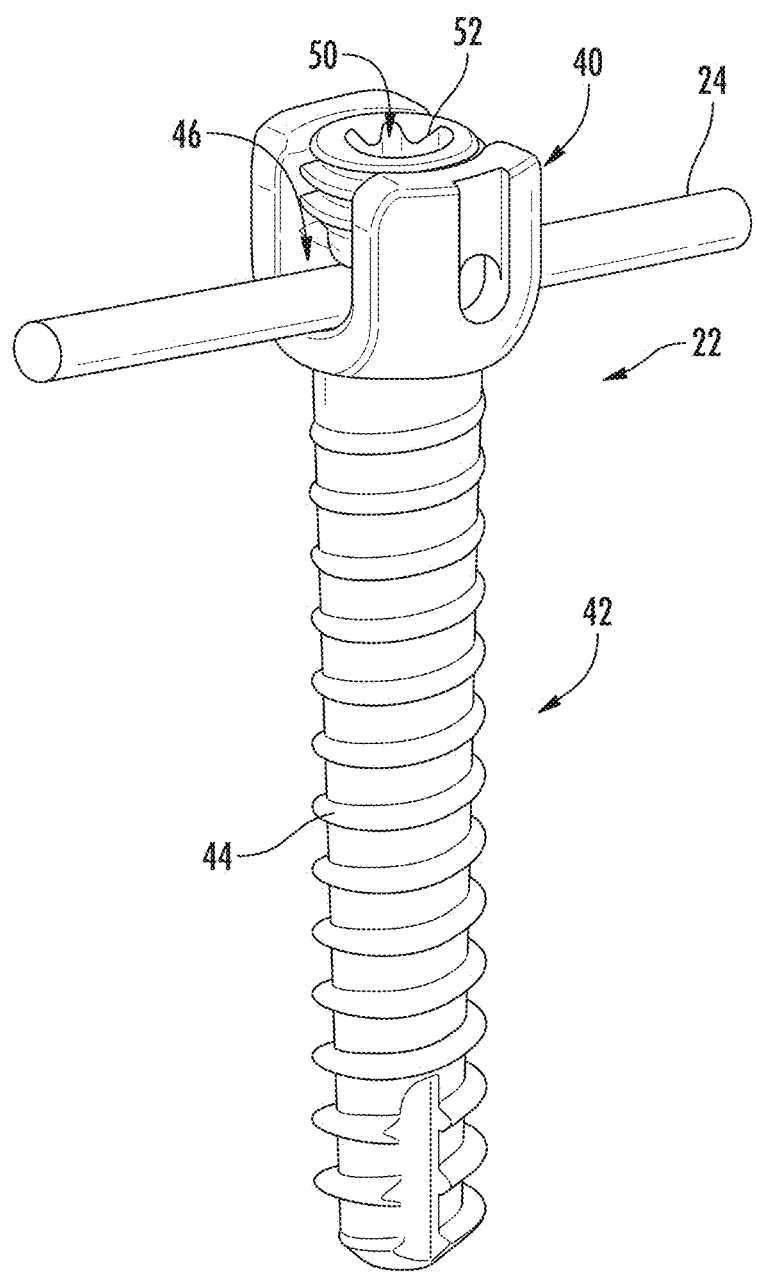
FIG. 8 illustrates a representative fixation element of the distraction systems herein.

In one such embodiment (shown in FIG. 8), bone anchors 22 comprise a screw having a head portion 40 and a shank portion 42 having a threaded shaft 44 (see FIG. 2). In certain embodiments, bone anchor 22 may comprise elements other than a threaded shaft for securing to a vertebral body, such as vertebral hooks. Threaded shaft 44 may be cannulated or uncannulated. For example, in one embodiment, the bone anchor 22 comprises a cannulated hydroxyapatite-coated vertebral bone screw and the shaft 44 can be cannulated and hydroxyapatite-coated. Head portion 40 may have any suitable cross-sectional shape, such as circular, square, rectangular, polygonal, elliptical or the like. In one embodiment, head portion 40 comprises a substantially U-shaped element (e.g., a tulip-head) having a central channel 46 for receiving connector element 24. Channel 46 may have a width or internal dimension that is substantially the same as an outer diameter of connector element 24. Alternatively, the width of channel 46 may be slightly larger or substantially larger than the diameter of connector element 24.

Head portion 40 may include a threaded region (not shown) for receiving a set screw 50 or other locking element. Set screw 50 includes a mating feature 52, such as a hexalobe interface or the like, for mating with an instrument to rotate set screw relative to bone anchor 22. In some embodiments, set screw 50 threadably engages head portion 40 and secures connector element 22 within channel 46. In other embodiments, connector element 24 may pass through channel 46 without being secured within channel 46.

In other embodiments, head portion 24 may have other cross-sectional shapes, such as circular, square, rectangular, polygonal, elliptical or the like. In these embodiments, head portion 40 may further include an opening, such as a bore, extending from the top surface of head portion 40 to a horizontal through hole that serves the same function as channel 46.

System 10 may further include an introducer (not shown) for implanting bone anchors 22 into the vertebral bodies. In certain embodiments, the introducer includes a screwdriver assembly having a ratcheting handle with a tap for creating a hole in the vertebral body to receive bone anchor 22. The screwdriver may further comprise a distal end that couples to head portion 40 of bone anchor 22 for screwing bone anchor into the hole created by the tap. The hole may be created, for example, within the central hole of an implanted anchor 11.

Implantable spinal system 10 may include a series of the distraction devices 20 that may be used along one side of a curved portion of the spine. For example, two or more distraction devices 20 may be linked or "stacked" at discrete or adjacent spinal segments for a modular approach to correct the spinal curvature at that side of the spine or to decompress the spine. In one embodiment, system 10 is positioned on a concave side of a vertebral column. In another embodiment, system 10 is positioned on the convex side of the vertebral column. In certain embodiments, the same or a different amount of distraction devices may be used on the opposing side of the spine, as a countereffect, or to supplement, the treatment. The modularity of the spinal system of the present disclosure allows the surgeon to customize the level of distraction at discrete locations on the spine.

As shown in FIG. 1, in certain embodiments, the series of distraction devices 20 are connected to each other to form a continuous distraction system over an anterior side of the vertebral column 100 (see FIGS. 2A-2C). Thus, a first bone anchor 22a is connected to a second bone anchor 22b by a first connector element 24a. A third bone anchor 22c is connected to the second bone anchor 22b by a second connector element 24b. The system may include two or more connector elements, depending on the area of spinal cord that requires correction or distraction. The connector elements are dynamic force elements that permits the entire system to lengthen over time. In certain embodiments, each of the connector elements has substantially the same elasticity such that each length at the same rate over time. In other embodiments, the connector elements may be provided with different elasticities to individually tailor the distraction provided at each spinal segment.

Figure 3:
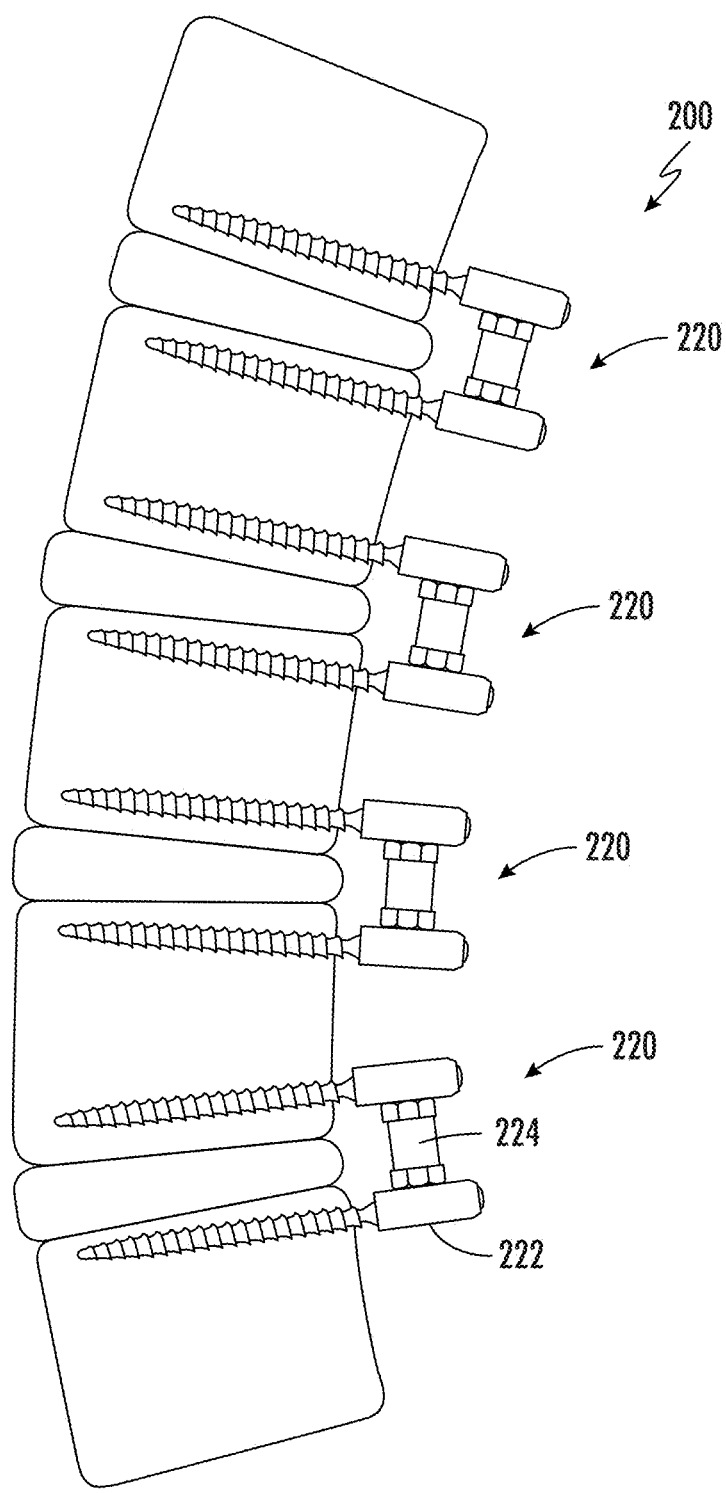
FIG. 3 illustrates another exemplary embodiment of an implantable distraction system for treating a spinal disorder.
Figure 4:
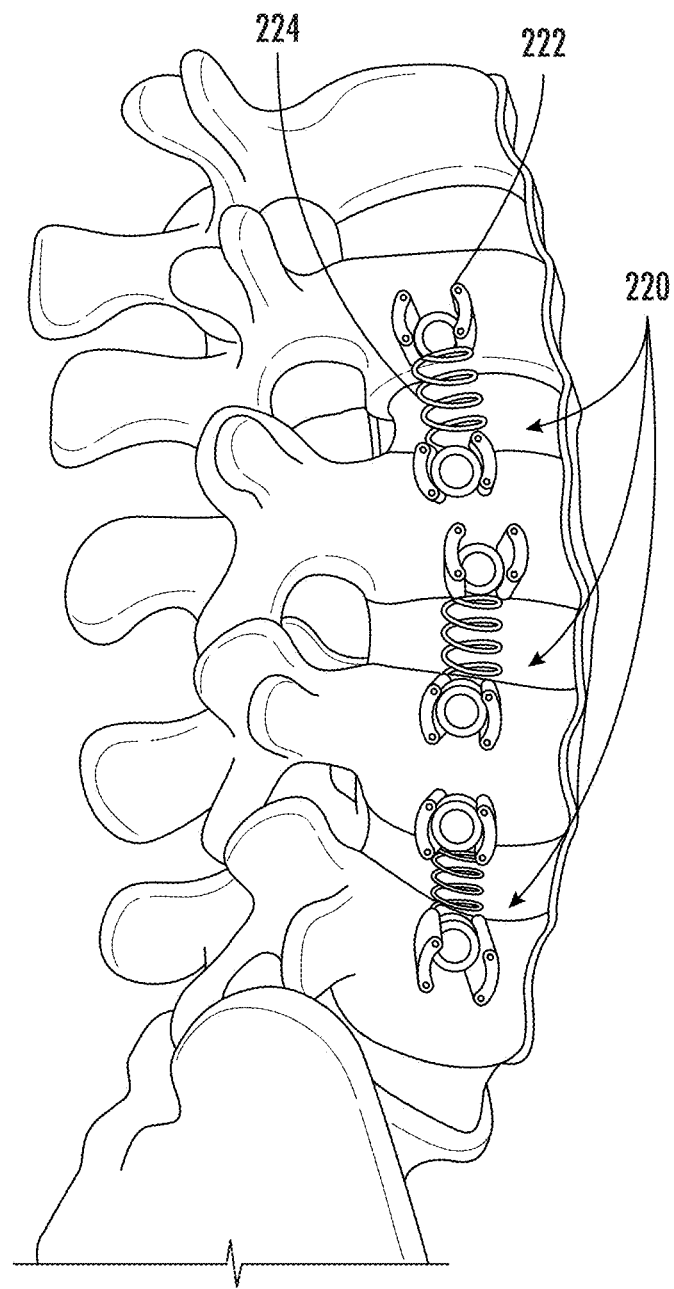
FIG. 4 illustrates the distraction system of FIG. 3 implanted on a vertebral column.

Referring now to FIG. 3, another embodiment of a spinal system 200 comprises one or more of distraction devices 220 for the treatment of a spinal segment within a target portion of a vertebral column (see FIGS. 4A-4C). As in the previous embodiment, each distraction device 220 may comprise a pair of fixation devices, such as bone anchors 222, connected with a flexible, resilient connector element 224. In this embodiment, the distraction devices 220 are not coupled to each other such that each device 220 forms an independent implant across each disc. The distraction devices may be implanted on adjacent discs as shown in FIG. 3 such that two bone anchors 222 are attached to each disc with a connector element 224 extending from that disc to an inferior disc and a superior disc. In other embodiments, the distraction devices 220 may be inserted into discs that are not adjacent to each other in any sequence or pattern across the spinal column.

System 10 may be inserted using a posterior or an anterior surgical approach. In one embodiment, a spinal instrument (not shown) may be advanced through an anterior opening of the patient. The spinal instrument may have a distal end that is removably coupled to a first bone anchor 22. The first bone anchor 22 may be secured to a first vertebral body or to a first rib bone. The instrument may then be removed from the patient and reinserted to secure a second bone anchor 22 to a second vertebral body or a second rib bone. This process may be continued until a bone anchor is secured to each vertebral body or rib in the curved portion of the vertebral column. Alternatively, the bone anchors may be secured to only some of the vertebral bodies (e.g., every other vertebral body, or some other suitable pattern).

Once the bone anchors 22 are secured to the vertebral bodies, connector element 24 may be advanced longitudinally through channels 46 in each bone anchor 22. Connector element 24 may be inserted through an extension spring tube (not shown) prior to insertion onto channels 48. A cord alignment instrument (not shown) may be used to align connector element 24 with channels 46. A suitable distraction force may be provided to connector element 24 with an external instrument or an internal member. In some embodiments, the distraction force may be applied to connector element 24 after it has been advanced through all of the bone anchors 22. In other embodiments, the distraction force may be applied to connector element 24 separately between each adjoining vertebral bodies prior to advancing it through the next vertebral body.

The distraction force may be applied to connector element 24 sequentially one motion segment at a time, or the distraction force may be applied to more than one motion segment at the same time. Distraction will provide an initial correction of the curve being treated and/or it will decompress the portion of the curve being treated, but more importantly it will allow for growth modulation at the levels instrumented. The amount of distraction will vary from patient to patient and ultimately be dependent on a multitude of factors, including preoperative Cobb angle, curve flexibility, curve type(s), curve location(s), skeletal maturity, and anticipated growth among others. The forces applied to the different levels should be selected such that distraction and the resulting growth modulation will be able to achieve the desired correction over time.

Once connector element 24 has been distracted to a prescribed force to adequately correct the curvature, it may be secured to each of the bone anchors 22. Alternatively, connector element 24 may be partially or fully secured to one or more of the bone anchors 22 before the distraction step. In one embodiment, set screws 50 are placed into head portions 40 of bone anchors 22 and screwed into the threaded portions of head portions 40 to secure connector element 24 to each bone anchor 22. Screws 50 may be secured to bone anchors 22 with, for example, a T-handle screwdriver or the like. In some embodiments, connector element 24 may only be secured to some of the bone anchors 24. If there is excess length of connector element 24 present, it may be trimmed before or after distraction. The distraction on connector element 24 may be adjustable by, for example, a spring member or other distraction device to attain the desired amount of distraction in connector element 24.

The placement of system 10 may depend on the type of deformity to be corrected and/or the curvature of the spinal column to be corrected. For example, the position of bone anchors 22 may be dictated by the curvature of the spine on a case by case basis. In some instances, the position of each bone anchor 22 may vary from one vertebra to the next vertebra (or one rib to the next). In instances where the spinal column has a compound curvature (e.g., has multiple curved portions), it may be desirable to implant one or more systems 10 on the concave sides of each of the curved portions of the spinal column.

A single correction system 10 may be implanted and applied to the spinal column or multiple correction systems 10 may be applied to the spinal column. For example, multiple correction systems 10 may be implanted and applied in parallel on a single aspect of the spinal column and/or multiple correction systems 10 may be implanted at different locations of the spinal column (e.g., throughout different curved regions of the spine, and/or at different levels of the spine). In certain embodiments, a first correction system 10 may be implanted on the concave side of the curvature, and a second correction system 10 may be implanted on the convex side of the curvature.

Figure 5:
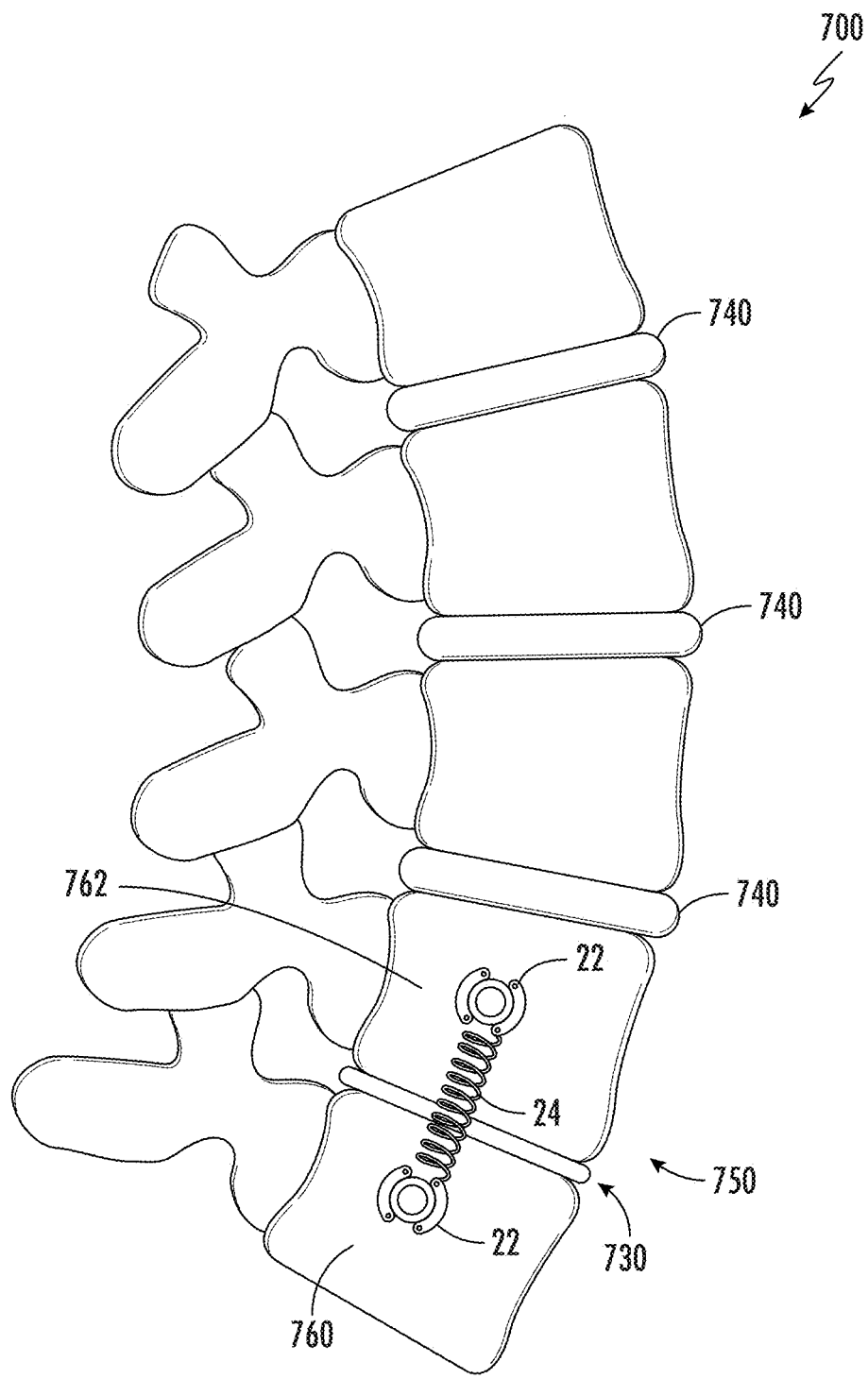
FIG. 5 illustrates an exemplary embodiment of a distraction system for decompressing a vertebral column with a degenerative disc.

FIG. 5 illustrates a spinal column 700 with a degenerated disc 730 that has thinned such that it no longer has its original height (i.e., the height shown in healthy discs 740). Disc 730 may also be bulging and/or herniated such that it presses on spinal nerves and causes pain and/or lack of mobility.

In this embodiment, system 10 may be placed on the anterior side of the spine in the region 750 opposite degenerated disc 730 to decompress the spine in this region 730 and potentially restore the height of disc 730 by changing the curvature in the spine (i.e., by reducing the degree of curve in region 750 and thereby increasing a distance and/or angle between vertebral bodies 760, 762). This may also relieve any pressure that a bulging or herniated disc exerts on the spinal nerves in this region 750.

In one method, bone anchors 22, 24 are secured to vertebral bodies in region 750 and connector element 24 is advanced longitudinally through channels 46 in each bone anchor 22, as described above. A suitable distraction force may be provided to connector element 24 with an external instrument or an internal member. In some embodiments, the distraction force may be applied to connector element 24 after it has been advanced through both of the bone anchors 22. In other embodiments, the distraction force may be applied to connector element 24 separately between each adjoining vertebral bodies prior to advancing it through the next vertebral body.

Distraction will provide an initial decompression of the are being treated in region 750. The amount of distraction will vary from patient to patient and ultimately be dependent on a multitude of factors, including the degree of degeneration of disc 730. The forces applied to the different levels should be selected such that distraction will be able to achieve the desired decompression over time.

Once connector element 24 has been distracted to a prescribed force to adequately decompress region 750 around disc 730, it may be secured to each of the bone anchors 22. Alternatively, connector element 24 may be partially or fully secured to one or more of the bone anchors 22 before the distraction step.

In certain embodiments, device 10 consists of a single connector element 24 and first and second bone anchors 22 and is configured to distraction of a single level in the spinal cord, as shown in FIG. 5. This allows the surgeon to target the thinned disc 730 without interfering with, or otherwise compromising the adjacent healthy discs 740.

Figure 6A:
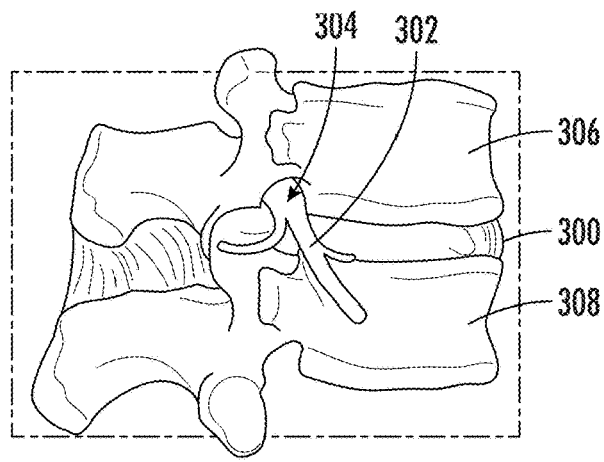
FIG. 6A illustrates a neural foramen in a healthy lumbar spine.
Figure 6B:
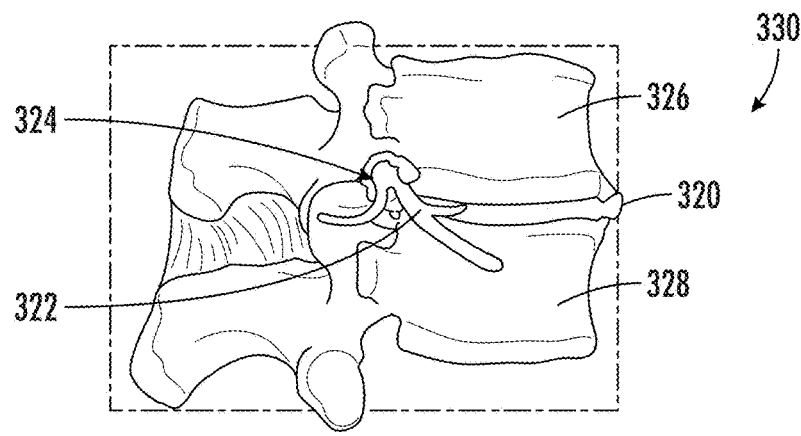
FIG. 6B illustrates a neural foramen in a lumbar spine with foraminal stenosis.
Figure 7:
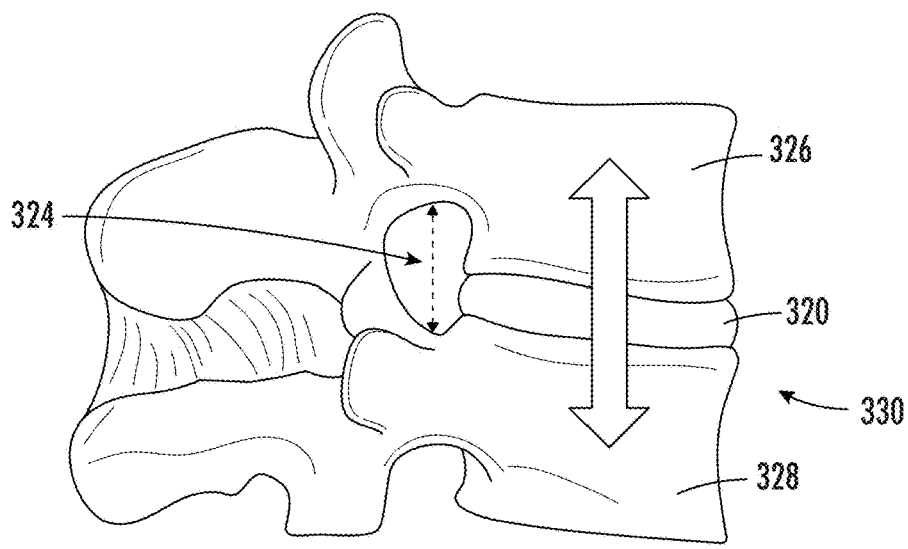
FIG. 7 illustrates the neural foramina being opened to decompress the nerve by the systems and methods described herein.

Referring now to FIGS. 6A, 6B and 7, system is particularly advantageous for decompression of a target area of the spine in a patient with spinal stenosis, such as the neural foramen. FIG. 6A illustrates a representative healthy spine with a normal disc height. As shown, disc 300 has a height that allows for a spinal nerve 302 to pass through the neural foramen 304 without being compressed.

FIG. 6B illustrates a spinal segment 330 having a degenerative collapsed disc 320. As shown, disc 320 provides less space between vertebral bodies 326, 328 such that the neural foramen 324 is narrowed. This narrowed foramen 324 presses against spinal nerve 322, which may cause pain in the back, sciatica and/or numbness, cramping, weakness in the legs or feet.

Referring now to FIG. 7, system 10 distracts spinal segment 330 such that vertebral bodies 326, 328 are moved away from each other, which increases the space within neural foramen 324, thereby decompressing the spinal nerve therein.

Figure 10A:
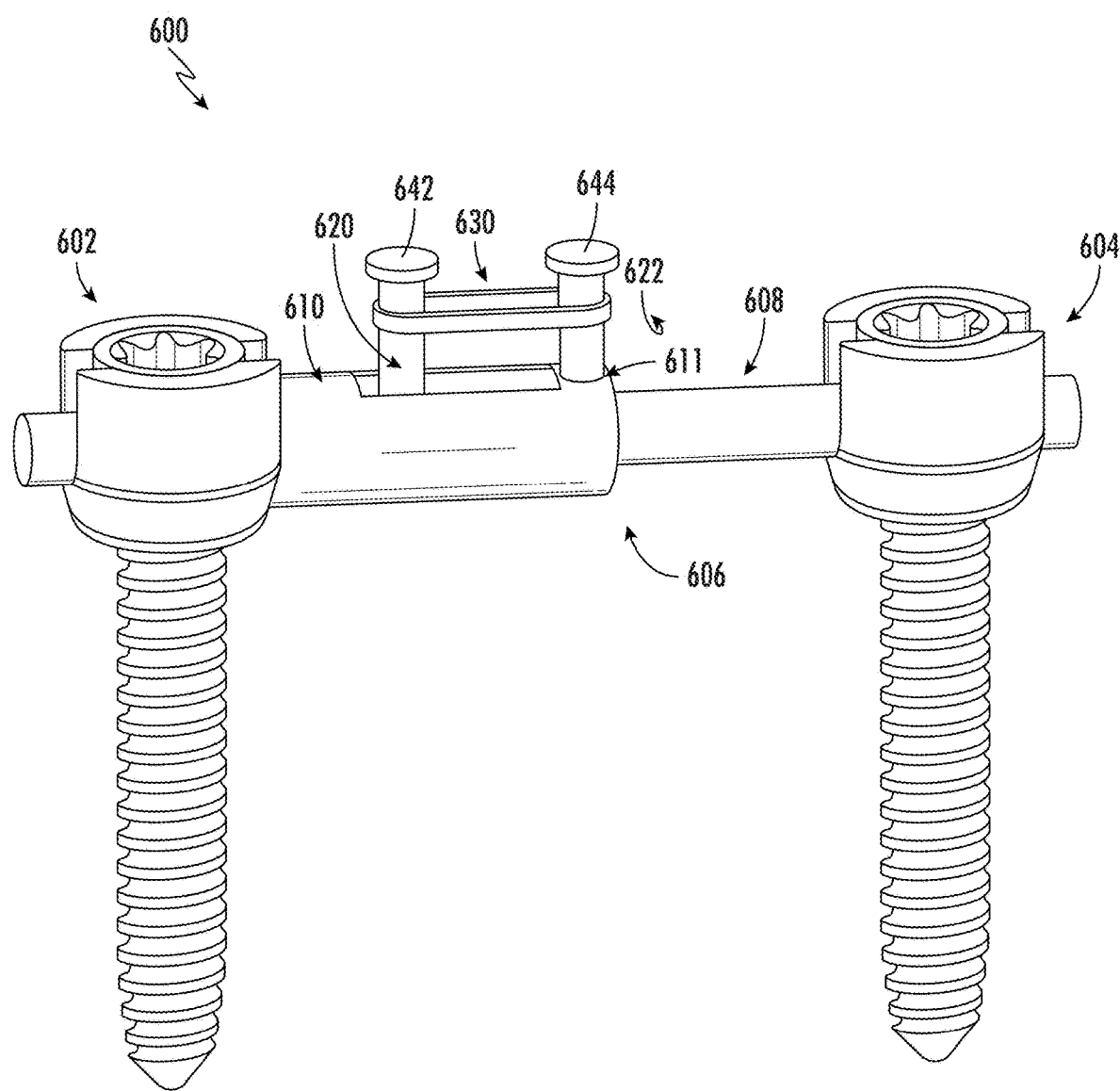
FIG. 10A is a side view of an alternative embodiment of an implantable distraction system for treating a spinal disorder.
Figure 10B:
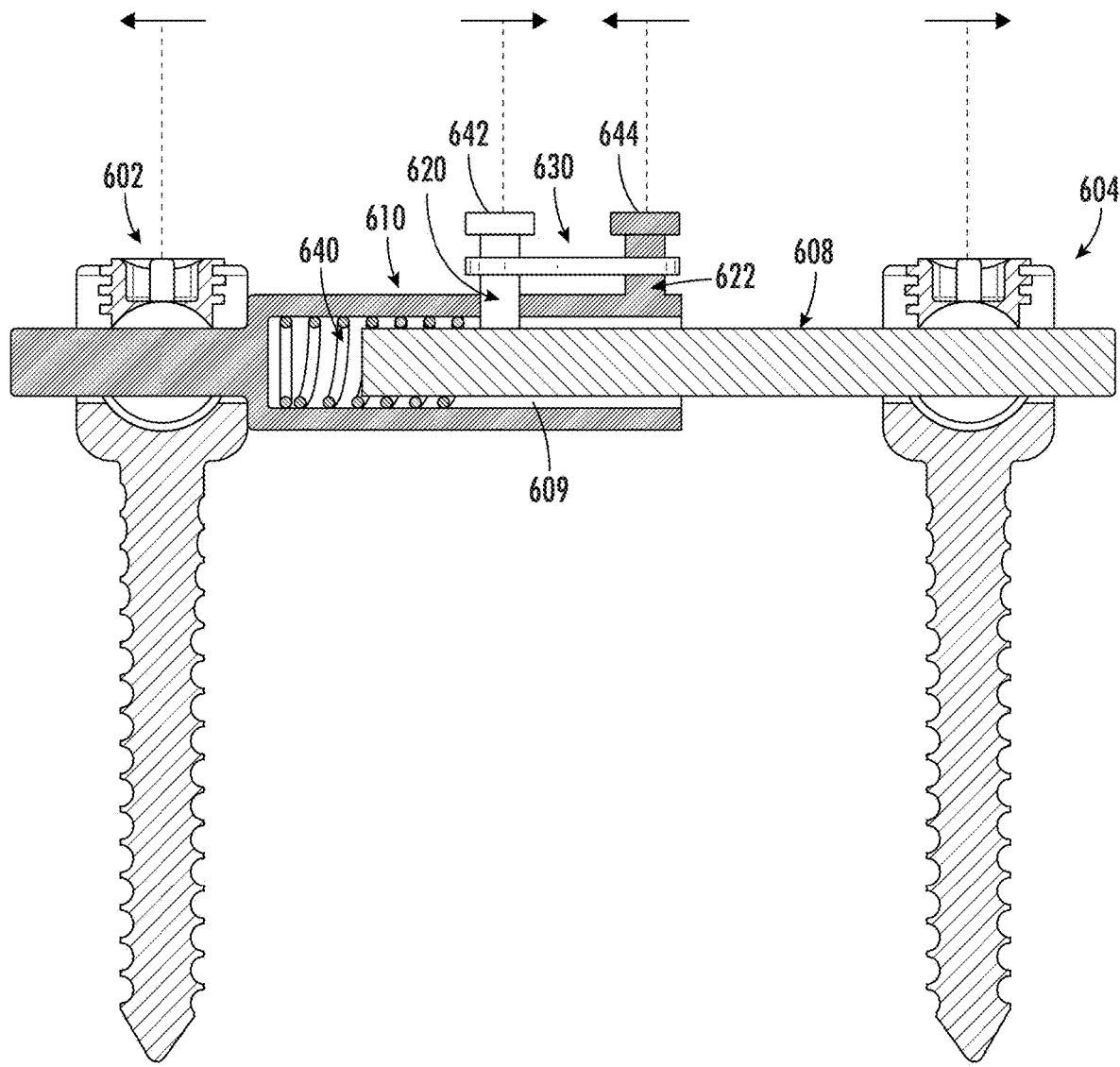
FIG. 10B is a partial cross-sectional view of the implantable distraction system of FIG. 10A.

System 10 is also advantageous for correcting abnormal curvatures of the spine. For example, in various embodiments, the system and method can be used to correct curvatures caused by scoliosis. In one embodiment, distraction of scoliosis is achieved across concave screws. As previously discussed, one of the benefits of the present system is that it allows for multi-plane correction of the scoliotic spine. The system improves scoliosis in the coronal plane, and/or improves hypokyphosis in the sagittal plane. FIG. 9A illustrates a spinal column 400 before such correction, and FIG. 9B illustrates the spinal column 400 after system 10 has been implanted and corrected the abnormal curvature in the spinal column 400. FIG. 10A illustrates a spinal column 500 with hypokyphosis (e.g., about 38 degrees of kyphosis) and FIG. 10B illustrates the spinal column 500 after correction with the device(s) and methods described herein (e.g., about 22 degrees of kyphosis).

For example, the system 10 can be applied to a front, anterior part of a patient's spine. The system 10 can be placed along the concave portion of the scoliotic curve in the front, anterior part of the spine. Placement of the system 10 in this manner enables distraction in the frontal plane, and derotation of the spine, thus creating desirable lordosis. In the lumbar spine, creation of lordosis provides a clinical benefit. The application of the present system 10 in the front (anterior) part of the spine provides a distinct advantage over currently existing spinal systems that compress across the convex lumbar spine, reducing desired lordosis of the spine, while creating undesired kyphosis instead.

As noted above, one of the great benefits of the spinal system of the present disclosure is that fusion is avoided and motion is preserved, which is particularly desirable for a young patient having a growing spine. This treatment should make the spine and patient taller. Of course, it should be understood that the present spinal system is not limited to use in young patients, as the benefits of the system may be enjoyed by adults with scoliosis as well. For example, the system is particularly desirable for use in adults without a growing spine, but who wish to delay fusion as well.

In another embodiment, the system 10 may be used to distract across the concavity of the lumbar spine to create or correct lordosis. In this embodiment, system 10 may be placed on the concave side of the spine in the region 610 wherein the abnormal curvature exists to correct the lordosis in that region.

Referring now to FIGS. 10A, 10B, 11A and 11B, another embodiment of an implantable spinal system is provided that may be used to decompress a target area of the spine to restore disc height, decompress spinal nerves and/or reduce pain within the target area with or without fusing one or more intervertebral bodies. FIGS. 10A and 10B illustrate a distraction device 600. The system may include one, two, three or more such distraction devices, depending on the application. Each distraction device 600 allows for decompression and/or correction of the curvature of the spinal segment to which it is attached. In other embodiments, the system may be useful in correcting spinal deformities related to an abnormal curvature of the spine, such as lordosis, kyphosis, or scoliosis.

As shown, distraction device 600 comprises first and second bone anchors 602, 604 configured for implantation to adjacent vertebral bodies 762, 760 on either side of a disc 730 and connected with a flexible, resilient connector element 606. Bone anchor(s) 602, 604 may comprise any anchor configured for attachment to the bone of the spine or ribs, including but not limited, to screws, hooks, darts, ties, or any other element for fixing the longitudinal portion to bone.

In this embodiment, connector element 606 comprises a first member 610 extending from first bone anchor 602 and a second member 608 extending from second bone anchor 604. First and second members 608 may comprise a shaft, rod, cord, cable, or band. In an exemplary embodiment, members 608 comprise rods. First rod 610 has an internal channel or lumen 609 for receiving first rod 608 such that rods 610, 608 may be moved relative to each other and together form a telescoping rod connecting bone anchors 602, 604. First and second rods 610, 608 may be removably coupled to anchors 602, 604, or they may be integral with anchors 602, 604. In an exemplary embodiment, rods 610, 608 are removably couplable to anchors 602, 604 such that anchors 602, 604 may be secured to vertebral bodies 762, 760 before connector element 606 is attached to the anchors.

First and second rods 610, 608 each include a projection 620, 622, such as a pin, rod, shaft, or the like, extending transversely away from rods 610, 608, preferably in the direction away from vertebral bodies 760, 762. Projections 620, 622 may be coupled to, or integral with, rods 610, 608. First rod 610 may also include a slot 611 for allowing projection 620 to extend through slot 611 and slide relative to first rod 610 (discussed below).

Connector element 606 further comprises an elastic band 630 wrapped around each of the projections 620, 622. Elastic band 630 may comprise any suitable material, such as rubber, elastin, nylon, Lycra, polyester or the like, that stretches when a threshold force is applied to either, or both, ends of band 630. Projections 620, 622 may each further comprise an outer tip 642, 644 having a larger diameter than the diameter of projections 620, 622. Outer tips 642, 644 ensure that elastic band 630 does not slide off projections 620, 622 in use.

Elastic band 630 functions to provide a dynamic force element between bone anchors 602, 604. Elastic band 630 is extendible between first and second bone anchors 602, 604 and configured to shorten in length over time to naturally bias projections 620, 622 towards each other, which biases anchors 602, 604 apart from each other to create a force that decompresses disc 730. As shown, as elastic band 630 pulls projection 620 towards projection 622 (in the direction of the arrows in FIG. 10B), it causes bone anchors 602, 604 to move apart from each other (in the direction of the arrows in FIG. 10B). Thus, the force applied by distraction device 600 to the spinal segment changes over time as the spinal segment is distracted, which allows distraction device 600 to distract a target portion of the vertebral column and at least partially decompress the target portion of the vertebral column. Alternatively, the force applied by distraction device 600 may be sufficient to adjust the curvature of the vertebral column.

Connector element 606 may include an additional force element 640, such as a spring or the like, within internal channel 609. Spring 640 is biased against the surface of projection 620 that extends through slot 609 into rod 610 such that spring 640 naturally biases projection 620 away from anchor 602, which biases anchors 602, 604 apart from each other to create an additional force that decompresses disc 730 (discussed below).

Figure 11B:
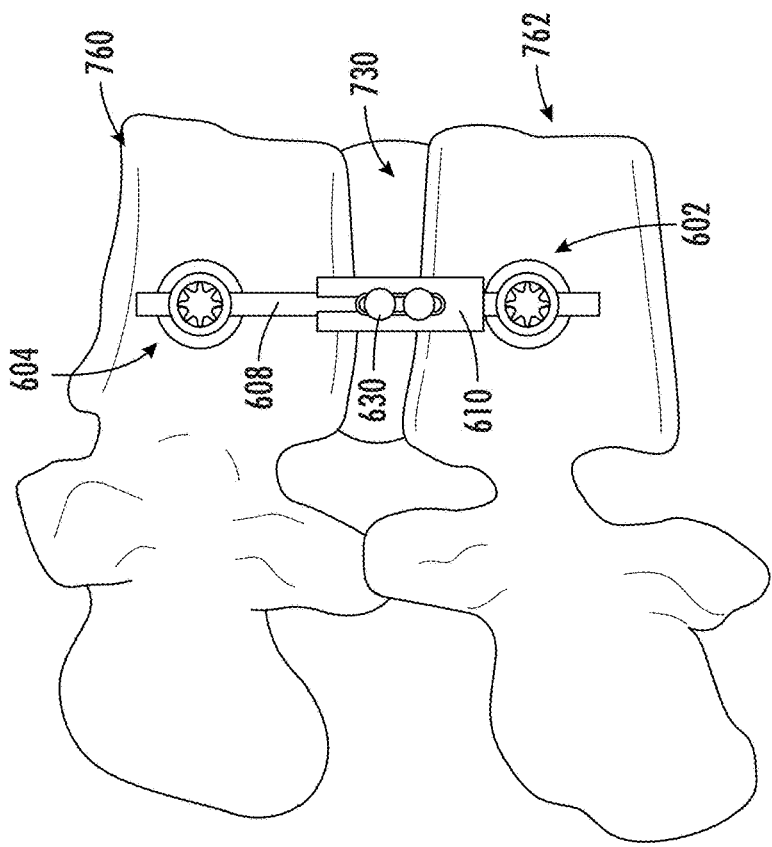
FIGS. 11A and 11B illustrate the distraction system of FIGS. 10A and 10B implanted on a vertebral column.
Figure 11A:
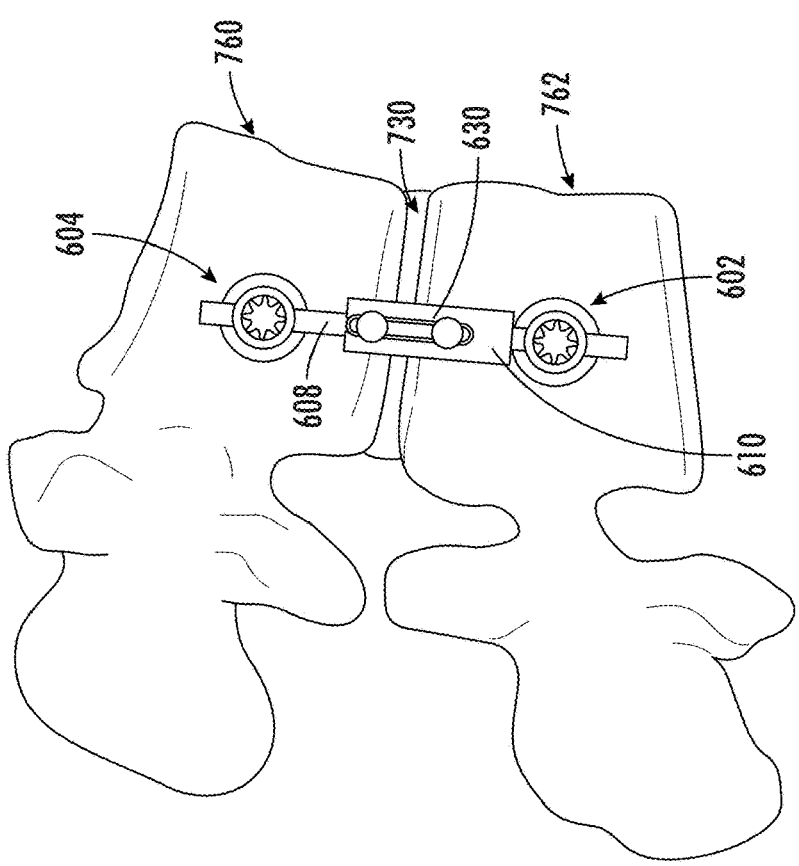

Referring now to FIGS. 11A and 11B, device 600 may be used to decompress a target area of the spine to restore disc height, decompress spinal nerves and/or reduce pain within the target area with or without fusing one or more intervertebral bodies. FIG. 12A illustrates a degenerated disc 730 that has thinned such that it no longer has its original height. Disc 730 may also be bulging and/or herniated such that it presses on spinal nerves and causes pain and/or lack of mobility.

In use, anchors 602, 604 are implanted into the two adjacent vertebral bodies 762, 764, as described above. Initially, elastic band 630 extends around projections 620, 622 such that anchors 602, 604 remain in place relative to each other (FIG. 11A). Over time, the elastic band 630 will pull projections 640, 642 towards each other, which urges anchors 602, 604 away from each other. In addition, spring 640 may provide additional force against projection 620, as discussed above. As shown in FIG. 11B, as anchor 604 is urged away from anchor 602, the space between vertebral bodies 760, 762 increases (i.e., the height of disc 730 increases), which causes decompression of the disc 730, thereby potentially restoring at least some (if not all) of the original disc height, decompressing spinal nerves and/or reduce pain within the target area.

Figure 12:
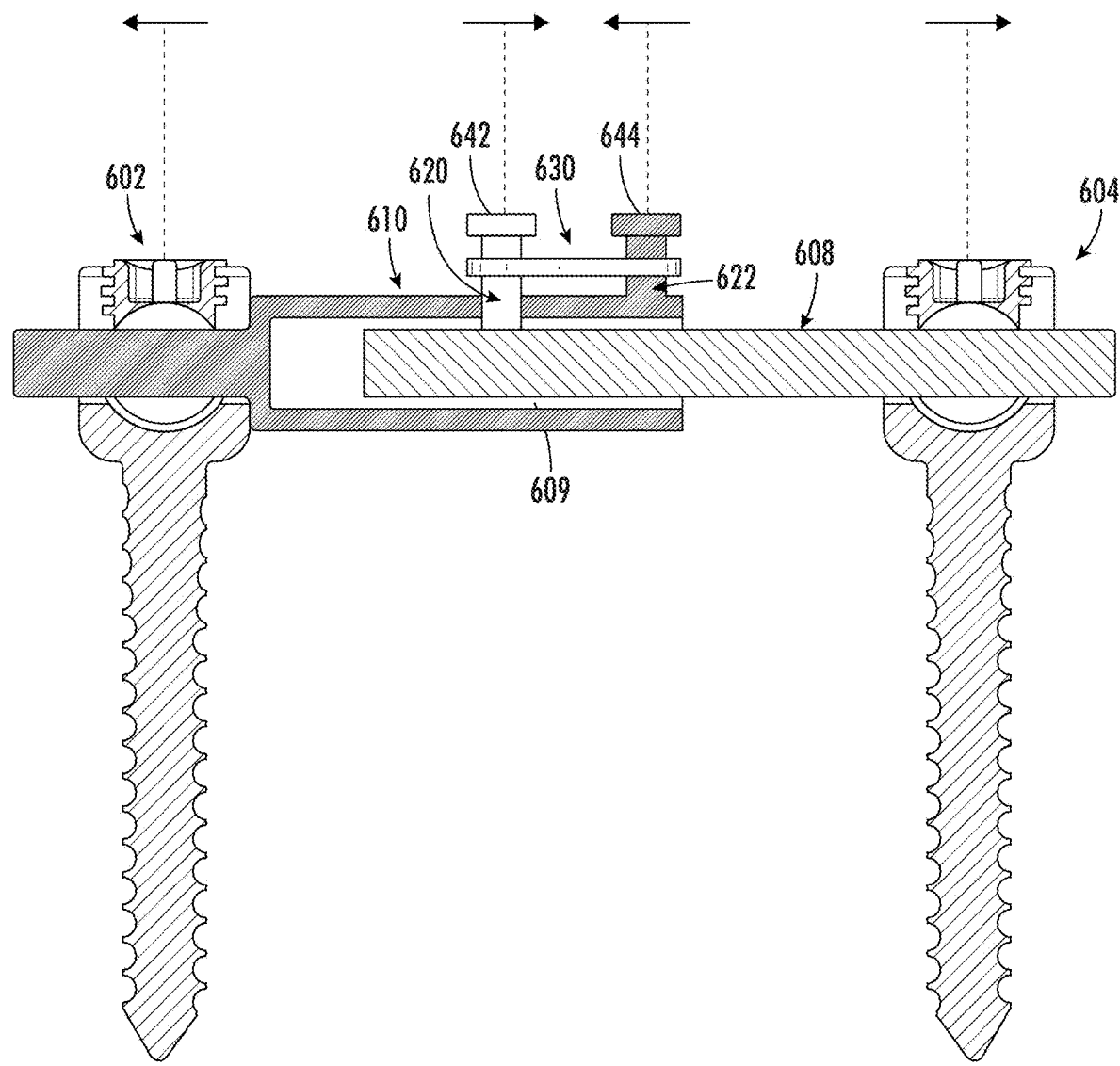
FIG. 12 is a partial cross-sectional view of an alternative embodiment of an implantable distraction system for treating a spinal disorder.

Referring now to FIG. 12, an alternative embodiment of system 600 includes all of the components of the previous system shown in FIGS. 10A and 10B except for spring 640. In this embodiment, elastic band 630 is the sole dynamic force element that biases anchors 602, 604 away from each other.

Figure 13:
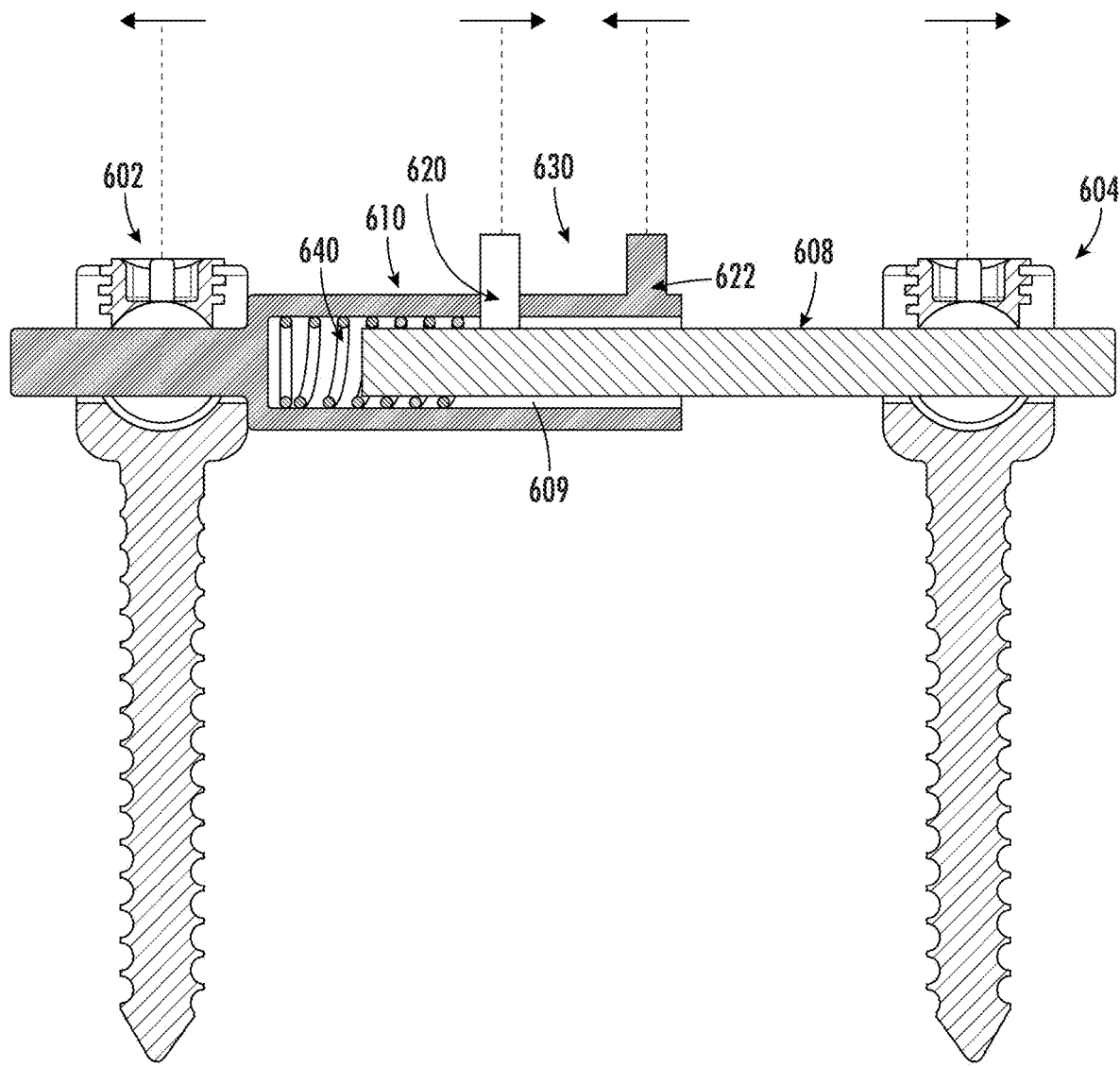
FIG. 13 is a partial cross-sectional view of an alternative embodiment of an implantable distraction system for treating a spinal disorder.

Referring now to FIG. 13, another alternative embodiment of system 600 includes all of the components of the previous system shown in FIGS. 10A and 10B except for elastic band 630. In this embodiment, spring 640 is the sole dynamic force element that biases anchors 602, 604 away from each other.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:

1. An implantable spinal device for decompressing a spine of a patient, the device comprising:
   first and second bone anchors configured for securing to first and second adjacent vertebral bodies, wherein the first bone anchor comprises a first rod with an internal channel and the second bone anchor comprises a second rod configured to extend into the internal channel of the first rod, wherein the second rod is movable relative to the first rod to move the first and second bone anchors towards and away from each other;
   a dynamic force element extendible between the first and second bone anchors and configured to lengthen over time to distract the vertebral column and at least partially decompress a target portion of the vertebral column, wherein the dynamic force element comprises an elastic band coupling the first rod with the second rod, wherein each of the first and second rods comprises a projection extending transversely from the first and second rods and the elastic band is wrapped around each of the projections to elastically couple the first bone anchor to the second bone anchor; and
a spring disposed within the first rod and in contact with the projection on the second rod and being configured to urge the first bone anchor away from the second bone anchor.

2. The spinal device of claim 1, wherein the dynamic force element further comprises a rod, cord, cable, or band.

3. The spinal device of claim 1, wherein the dynamic force element further comprises a spring.

4. The spinal device of claim 1, wherein the dynamic force element further comprises a polymer spacer.

5. The spinal device of claim 1, further comprising:
a third bone anchor configured for securing to the second vertebral body; and
a second dynamic force element extendible between the second and third bone anchors and configured to lengthen over time.

6. The spinal device of claim 1, further comprising:
a third bone anchor configured for securing to the second vertebral body;
a fourth bone anchor configured for securing to a third vertebral body adjacent to the second vertebral body and
a second dynamic force element extendible between the third and fourth bone anchors and configured to lengthen over time.

7. The spinal device of claim 6, wherein the third and fourth bone anchors are uncoupled from the first and second bone anchors.

8. The spinal device of claim 1, wherein the dynamic force element is configured to apply sufficient force to the first and second bone anchors to increase a distance between the first and second adjacent vertebral bodies within the target portion of the vertebral column.

9. The spinal device of claim 1, wherein the dynamic force element is configured to apply sufficient force to the first and second bone anchors to increase an angle between the first and second adjacent vertebral bodies within the target portion of the vertebral column.

10. The spinal device of claim 1, wherein the dynamic force element is configured to apply sufficient force to the first and second bone anchors to decompress one or more nerve roots within the target portion of the vertebral column.

11. The spinal device of claim 1, wherein the dynamic force element is configured to apply sufficient force to the first and second bone anchors to increase a height of a neural foramina in the patient.

12. The spinal device of claim 1, wherein the target portion of the vertebral column is curved and has a concave side and a convex side and wherein the first and second bone anchors are shaped and configured for placement against the first and second vertebral bodies on the convex side of the vertebral column.

13. The spinal device of claim 1, wherein the first bone anchor comprises a first head portion and a first shank portion, and the second bone anchor comprises a second head portion and a second shank portion, the first and second shank portions being configured to engage bone to secure the first and second bone anchors to the first and second adjacent vertebral bodies.

14. The spinal device of claim 13, wherein the dynamic force element is configured to be longitudinally displaceable through the first and second head portions.

* * * * *